United States Patent [19]
Vansant et al.

[11] Patent Number: 4,641,009
[45] Date of Patent: Feb. 3, 1987

[54] BRANCH-OFF TECHNIQUE

[75] Inventors: Jan Vansant, Leuven; Noel Overbergh, Bertem; Valere Buekers, Elem-Halen; Amandus L. E. Pieck, Kortenaken, all of Belgium

[73] Assignee: N.V. Raychem S.A., Diestsesteenweg, Belgium

[21] Appl. No.: 689,622

[22] Filed: Jan. 8, 1985

[51] Int. Cl.$^4$ .................. H05B 3/06; H02G 15/18; B29C 61/02
[52] U.S. Cl. .................. 219/200; 219/201; 219/505; 156/85
[58] Field of Search ............ 219/200, 201, 504, 505; 156/84, 85, 86; 29/883, 884, 447; 174/92, DIG. 8; 24/336, 339, 457; 403/273, 341

[56] References Cited

U.S. PATENT DOCUMENTS

| 4,085,286 | 4/1978 | Horsma et al. | 174/92 |
| 4,246,687 | 1/1981 | Nolf | 29/447 |
| 4,298,415 | 11/1981 | Nolf | 156/85 |
| 4,400,579 | 8/1983 | Nolf | 174/854 R |
| 4,410,379 | 10/1983 | Franckx | 156/54 |
| 4,458,104 | 7/1984 | Penneck et al. | 174/88 R |

FOREIGN PATENT DOCUMENTS

| 3012401 | 3/1980 | Fed. Rep. of Germany. | |
| 3105471 | 9/1982 | Fed. Rep. of Germany ... | 174/DIG. 8 |
| 1604981 | 12/1981 | United Kingdom. | |
| 2095926 | 10/1982 | United Kingdom. | |
| 2120025 | 11/1983 | United Kingdom ... | 174/92 |

Primary Examiner—E. A. Goldberg
Assistant Examiner—Teresa J. Walberg
Attorney, Agent, or Firm—T. Gene Dillahunty; Herbert G. Burkard

[57] ABSTRACT

A branch-off region at an end of a sleeve (2), enclosing for example a branch in a telecommunications cable, is sealed by positioning at the end of the sleeve (2) a clip (1) or a filling piece that forms terminal conduits (3), positioning a heat-activatable adhesive (5) in the end, and activating the adhesive by a heater such as an electrical heater.

22 Claims, 14 Drawing Figures

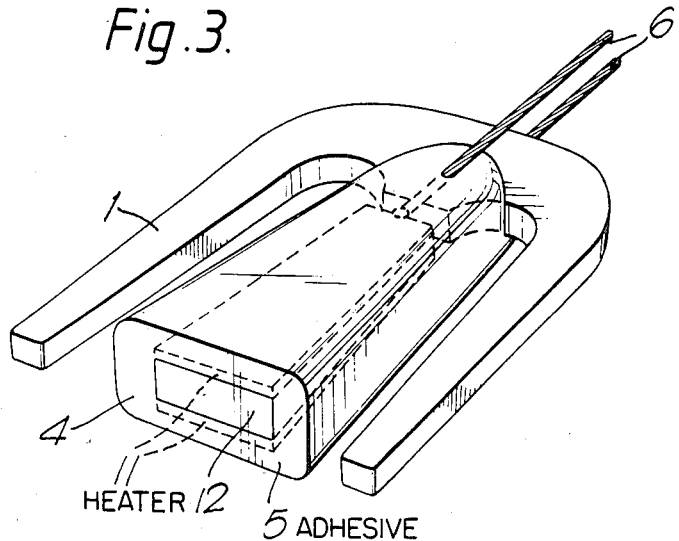
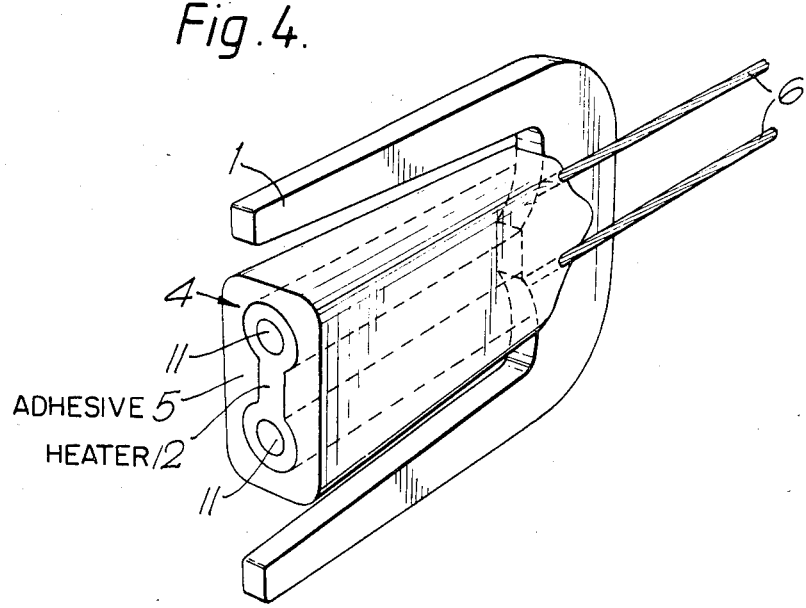

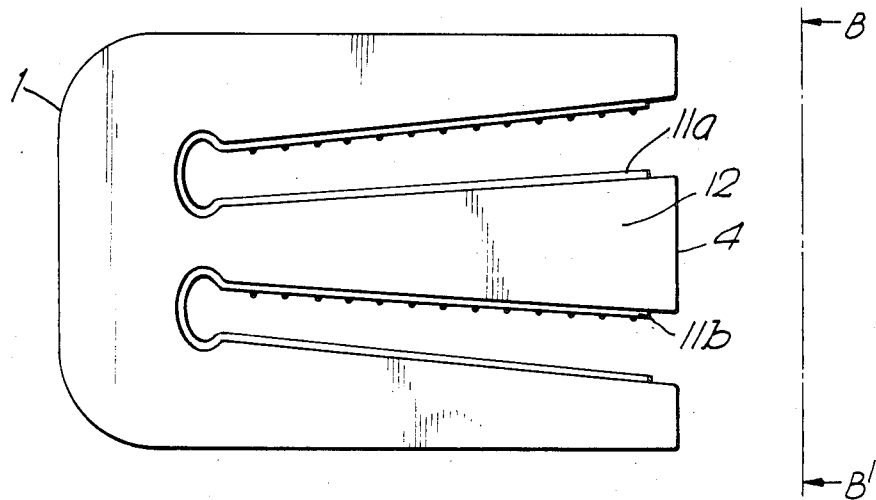
Fig.9a.
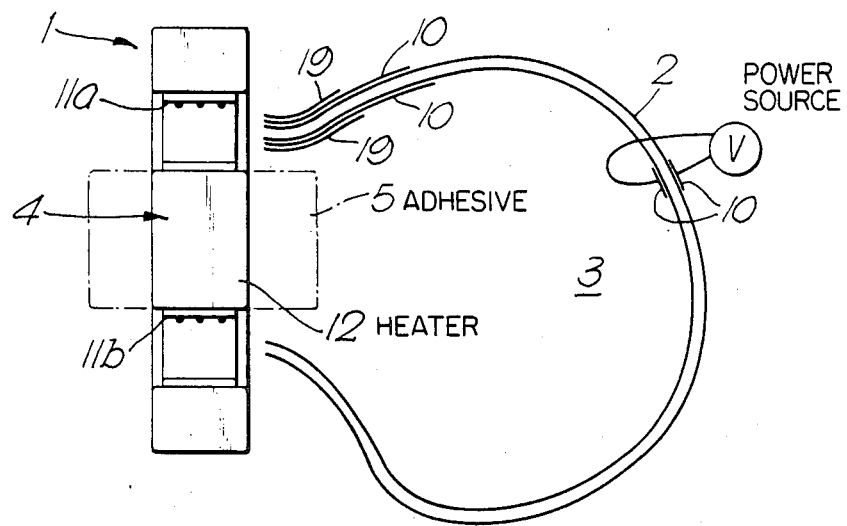
Fig.9b. (B—B')

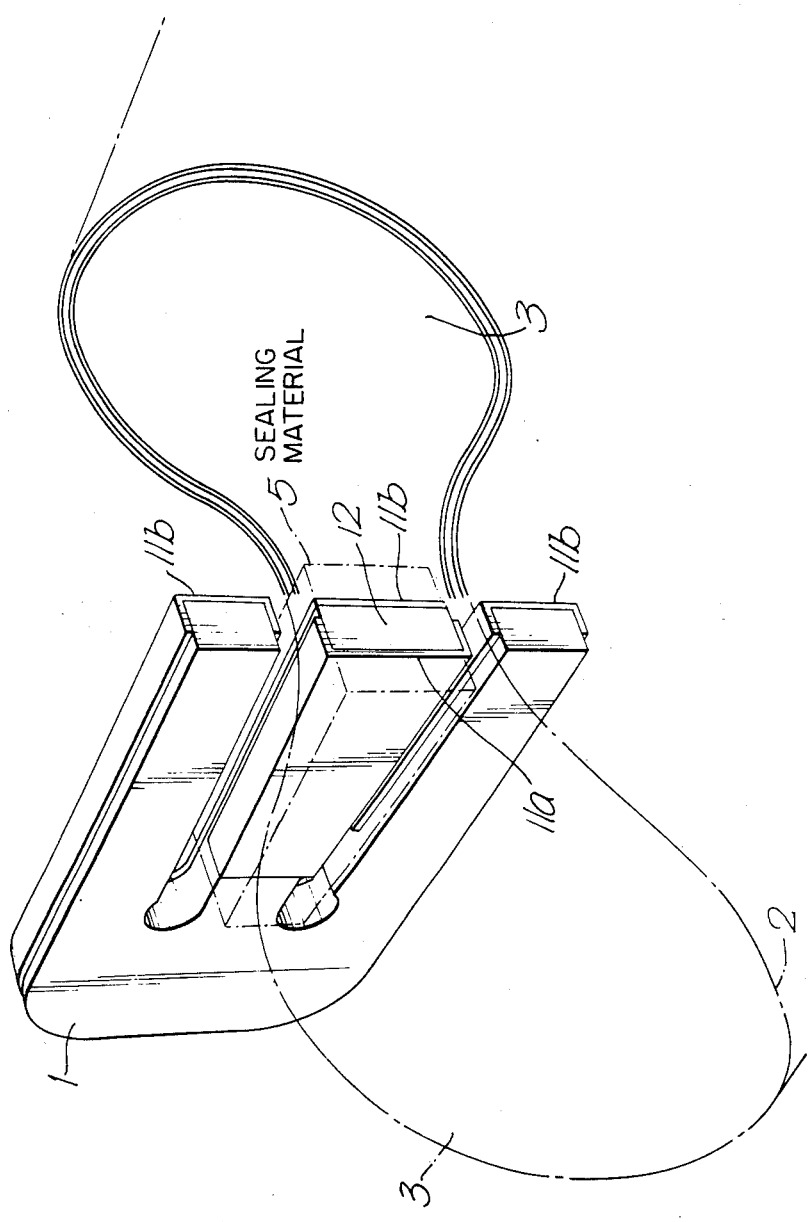

BRANCH-OFF TECHNIQUE

This invention relates to a technique for forming or maintaining a branch-off between substrates such as supplying lines.

Such substrates may be encapsulated by an article such as a sleeve in order to seal them against the environment, and where the diverging substrates leave the sleeve a clip may be installed to bring together opposing edge portions of the sleeve to form an individual conduit for each substrate. A branch-off clip for carrying out this function is disclosed in UK Pat. No. 1604981 equivalent to U.S. Pat. No. 4,298,415, which discloses a method of forming a branch-off seal between a heat-shrinkable sleeve and at least two substrates, which comprises the steps of:

(a) positioning a clip having at least two elongate legs on the heat-shrinkable sleeve at an open end thereof, with at least two of said legs being positioned externally of the sleeve, so as to form at least two terminal conduits;

(b) positioning the substrates within the conduits; and (c) applying heat so as to effect shrinkage and to form the desired seal.

A preferred form of clip is a three-legged clip having an inner leg comprising a heat-activatable sealing material. The clip is positioned with the outer legs outside the sleeve and the inner leg inside the sleeve and between the diverging substrates. The inner leg thus serves to deliver sealing material to the position between the substrates where it is desired. Heat is conducted from the outer legs or bridge part of the clip to the sealing material, thereby activating it.

Whilst this design of clip allows excellent sealing to be obtained, severe temperature-pressure cycling tests being passable, and requires a minimum inventory for a wide range of substrate sizes and branch-out configurations, some craft sensitivity may remain under adverse conditions. In particular, with large cable sizes or branch-offs involving many cables or where uniform application of heat is impossible, some difficulty may be experienced in supplying sufficient heat to activate fully the sealing material in the branch-off region. In general this will not be a problem (one simply continues heating for a short time after the installation appears to be complete), but with poor quality cables, damage to the cable jackets is possible.

We believe that the problem results from a difficulty in achieving the desired temperature gradients from the outside of the sleeve (or other article), particularly in the region of the outer legs of the clip, to the sealing material between the substrates. Although the temperature gradients are not excessive where the middle leg includes a central heat-conductor, this heat-conductor may itself become rather hot and in the worst case cause cable jacket damage. In DE No. 3105471 it is suggested that omitting the heat-conductor improves the situation, but the result tends to be disengagement of the adhesive (which here constitutes the inner leg) from the bridge portion of the clip and little subsequent heat-activation in those installations where difficulty is experienced.

The situation is particularly complex where, as in the prior art referred to, the encapsulating sleeve is heat-recoverable. Here, one must also consider the temperature and amount of heat required to cause proper recovery. It has hitherto been thought that these variables must be kept sufficiently low to avoid overheating the clip in order that cable damage be avoided, since although good heat conduction through at least most of the clip is required, a hot clip can cause cable damage.

SUMMARY OF THE INVENTION

We have now discovered that heat may be generated within the branch-off region to allow proper activation of sealing material without undesirable overheating elsewhere.

Thus, the present invention provides a method of forming a branch-off seal between a sleeve and at least two substrates which comprises:

(a) positioning at an end portion of the sleeve means for forming in the sleeve at least two terminal conduits, said means for forming including a heating means;

(b) positioning the substrates in respective conduits;

(c) positioning a heat-activatable material within the sleeve at or adjacent the end portion; and (d) activating the heat-activatable material by the heating means.

The means for forming the conduits in the sleeve is preferably either a branch-off clip, or a filling means which divides the end of the sleeve into at least two conduits.

In one embodiment, the present invention provides a branch-off clip which comprises at least two outer legs and an inner leg, so arranged that the clip can be positioned over the outer surface of a sleeve at an end thereof with the outer legs outside the sleeve and the inner leg inside the sleeve to form at least two terminal conduits in the sleeve; the inner leg comprising a heating means.

It is preferred that the heating means is electrical, particularly resistive. Additionally, a control means may be provided which cuts off the power on receipt of a signal generated for example by time, temperature or physical condition of the sealing material. The control means is preferably incorporated into the clip (although it may be merely in electrical contact therewith) and especially may result from an inherent property of at least part of the inner leg of the clip. Such a part of the inner leg may comprise a conductive polymer having a positive temperature co-efficient of resistance (PTC) and a switching temperature at or shortly above the activation temperature of the sealing material. The conductive polymer may act simply as a switch controlling a separate heater, but preferably it serves also as part or all of the heating means.

The present invention also provides a method of forming a branch-off seal between a sleeve and at least two substrates, which comprises the steps of:

(a) positioning a clip having at least two outer legs over the outer surface of the sleeve at an end thereof with the outer legs outside the sleeve so as to form at least two terminal conduits;

(b) positioning the substrates within the conduits;

(c) positioning a heat-activatable sealing material within the sleeve at a branch-off region of the substrates;

(d) positioning a heating means within the sleeve at a branch-off region of the substrates;

(e) causing the heating means to activate the sealing material to form the desired seal; and (f) where the sleeve is recoverable, causing recovery, especially heat recovery, of the sleeve.

The various steps of the method may be carried out in any order, although in general the heating means will be activated after steps (a) to (d) have been carried out; some prior heating to cause softening of the sealing material may however facilitate installation.

It is preferred that the sleeve be positioned around the substrates and the clip afterwards positioned to form or to maintain the conduits during the subsequent steps of installation or during the life-time of the product. Although the conduits need not strictly exist before positioning of the substrates, the substrates are said to be positioned within the conduits since the position of the conduits is at least substantially determined at that stage.

If the heating means or the sealing material is an integral part of the clip then method steps (a) and (d) or (a) and (c) will be carried out simultaneously. The heating means and/or the sealing material may, however, be separate from the outer legs of the clip before and/or after installation, in which case the steps referred to may be sequential.

The invention further provides a heating and sealing member (distinct from a clip, if any) positionable within an end portion of a sleeve, and which comprises an elongate member having self-contained heating means and an outer surface comprising a heat-activatable sealing material in thermal contact with the heating means. The heating means preferably has one or more of the features described herein with reference to an embodiment of the invention where the clip has an integral inner leg. The heating and sealing member may be for use with the outer legs of the clip or other means for providing two or more branching conduits at an end of a sleeve. Where the heating and sealing member is used with a clip, either the heating and sealing member or the outer legs of the clip preferably has means for connecting the two components together. However, such means is not necessary since the heating and sealing member and outer legs may be held together when positioned at the end of a sleeve.

The invention is particularly applicable to the encapsulation and sealing of telecommunications and high-voltage cables. The requirements here are for a barrier to water and other contaminants, for void-free application of stress-grading materials, and for pressure retention etc. Heat recoverable sleeves, of the wraparound or tubular design, are preferred, and where the clip is powered by electricity, they too preferably include an electrical heater. The heater for the sleeve may be a discrete heater, merely in thermal contact with a recoverable sleeve, but we prefer that the heater is an integral part of the sleeve. In this second case, the sleeve may comprise a conductive polymeric material to which the property of recoverability may be imparted and which has such a resistivity that it may be heated to cause recovery by connection to an electrical power source of a suitable voltage. As with the inner leg of the clip, the conductive polymeric material of the sleeve may exhibit a positive temperature co-efficient of resistance (PTC) by means of which power will automatically be substantially cut-off once the recovery temperature is reached or slightly exceeded.

Where an electrically heat-recoverable sleeve is used in conjunction with the new clip or heating and sealing member, the electrical properties of the two components are preferably co-ordinated such that independent control of each is not required of the installer. This is not essential since it is of course possible for the installer to cause recovery of the sleeve, and activation of any attendant adhesive or sealant coating, and when that is complete to cause activation of the sealing material of the clip. A further alternative is to use a power supply which is able to supply the correct power at the correct time to each of the two components. It is, however, beneficial for the sealing material to be softened, but not be capable of significant flow, during the period when the sleeve first recovers into conformity with the substrates. A desirable sequence is therefore as follows:

initial recovery of the sleeve;
softening of the sealing material of the clip or heating and sealing member;
completion of recovery of the sleeve;
and further activation of the sealing material to ensure proper adhesion or sealing. We prefer that such a sequence be achieved by a single switching operation on the part of the installer. The following variables are to be considered:
(a) recovery temperature of the sleeve;
(b) activation temperature of any sealing material on the sleeve;
(c) activation temperature of sealing material of the clip or heating and sealing member;
(d) switching temperature of PTC material of the sleeve;
(e) switching temperature of PTC material of the clip or heating and sealing member;
(f) low and high resistivities of the sleeve PTC; and
(g) low and high resistivities of the PTC material of the heating and sealing member or clip.

In addition, the thermal conductivity of the various components and ambient temperature will have an effect, as will the rate of electrical power input, but these factors are of a lesser importance. Other factors include the location of the PTC materials, and whether they constitute merely temperature indicators and switches in thermal contact with the sealing material and recoverable sleeve, or whether they function also as heaters.

In a preferred set-up the sleeve and the clip (or heating and sealing member) are electrically connected to the same power supply and in parallel. The resistivities in descending order are as follows: high clip PTC; high sleeve PTC; low clip PTC; low sleeve PTC. At first therefore current flows primarily through the sleeve PTC and the sleeve becomes hot and recovers causing the sleeve PTC to switch to its high resistivity. After that switch, the clip PTC now has a lower resistivity and an increased current therefore flows through the clip, causing sealing material on the clip to be softened, and when properly activated the power here switches off. The installer therefore has only one operation to perform. The low resistivity of the clip could be chosen such that a small initial current flows, thus providing an initial softening whilst avoiding significant flow. Similarly, some residual current can be maintained through the sleeve at its high resistivity level.

For the arrangement described, the following values are preferred:
(a) Recovery temperature of sleeve: 70–150, especially about 85°–135° C.
(b) Activation temperature of sleeve coating: 70–130, especially about 90°–120° C.
(c) Activation temperature of clip coating: 80–130, especially about 90°–120° C.
(d) Sleeve PTC switching temperature: 80–180, especially about 120°–160° C.
(e) Clip PTC switching temperature: 80–180, especially about 130° C.

(f) Low/high resistivity of sleeve PTC: $1/10$–$10^4/10^6$ ohm cm.

(g) Low/high resistivity of clip PTC: $1/10$–$10^4/10^6$ ohm cm.

The nature of the heating means of the inner leg of the clip (or heating and sealing member) will now be considered, and what is said here may apply also to a heater component of the sleeve. In a first embodiment, electrical heating wires or sheet may be bonded to or embedded in the clip so that the clip becomes hot by simple resistive heating. An alternative is to employ an inner leg (or sleeve) which itself becomes hot when subjected to electrical power. Conductive polymers such as those made by loading polyolefins with carbon black may be used, and they may be made self-regulating by proper choice of carbon content. The heating characteristics may be improved by combining a layer of PTC material having this particular carbon content with a layer of constant wattage (CW) material in such a way that current flows through both: this can lead to reduced current inrush on initial connection of power, and to greater heating capacity. For a fuller discussion on electrically heatable polymers the reader is directed to U.S. Pat. No. 4177376. Such PTC materials may be powered by sheet electrodes preferably extending over a significant extent of the surface of the material, or by wire or other generally cylindrical electrodes preferably extending through the material.

Where the invention is used with an electrically heat-recoverable sleeve, we prefer that the sleeve is of the wrap-around design and that closure members are provided by means of which the sleeve can be held in the wraparound configuration and through which the heating means of the sleeve can be powered. In particular, we prefer that the closure members comprise a first elongate conductor adjacent a first elongate edge portion of the sleeve and a second elongate conductor adjacent a second edge portion of the sleeve. The edge portions of the sleeve may be wrapped around respective conductors, and the two thickened edges that result may be held together by a C-shaped channel. The heater for the sleeve is preferably in series electrical contact between the two conductors. The conductors may be used to bus power to sheet electrodes which extend on either side of the material of the sleeve, which in this case preferably comprises a PTC material Such an arrangement is described and claimed in our copending UK patent application No. 8305639 equivalent to U.S. Ser. No. 584,045 filed Feb. 2, 1984.

The clip of the invention may possess one or more features in addition to those mentioned above. In particular, the gap between the outer legs and the inner leg may have a region of re-entrant shape or a taper away from the bridge of the clip, by means of which the possibility of the clip milking-off the end of the sleeve is reduced. Where the inner leg consists of for example a wire heater and a sealing material, a stub may be provided adjacent the bridge in order to accomodate such an anti-milk-off profile. Secondly, provision may be made to move the legs of the clip relative to one another before, during or after installation. This may be provided to allow ease of insertion together with a tight branch-off, or to allow the clip to follow the decreasing dimensions of a recoverable sleeve. The self-control of temperature mentioned may be used together with or replaced by some form of visible indication that sufficient heat has been supplied. For example a temperature-indicating composition may be applied to the clip or to the sleeve, or some marker may be provided which moves, or becomes able to be moved, at a certain temperature.

The invention is further illustrated with reference to the accompanying drawings, in which:

FIGS. 3–6 show various designs of electrically-heatable clip;

FIGS. 9–11 show ways in which electrical connection may be made between clip and sleeve.

Figure 1:
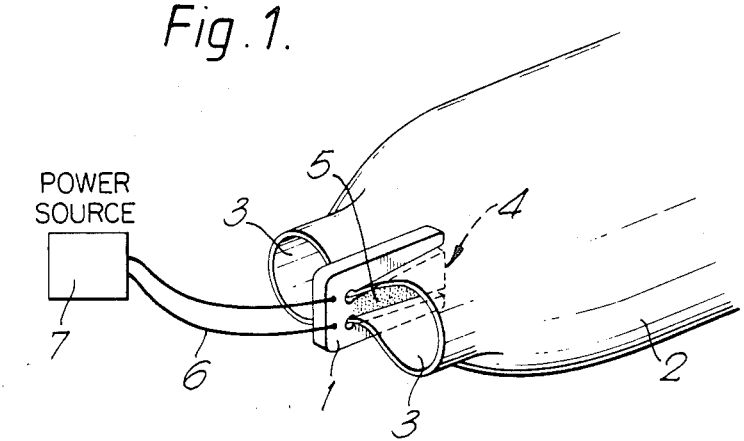
FIG. 1 shows a sleeve having an electrically-heatable clip at an end thereof.

In FIG. 1, a clip 1 has been installed on an end of a tubular sleeve 2 to form two conduits 3 in an end portion of the sleeve. In this way, a branch-off between substrates such as telecommunications cables can be sealed: the splice between the cables is housed in the sleeve 2 and the cables leave through the conduits 3. The inner leg 4 of the clip 1 is coated with a heat-activatable sealing material 5, preferably a hot-melt adhesive such as a polyamide. Heating means is provided in thermal contact with, preferably within, the sealing material 5 and is connected electrically by means of conductors 6 to a source of electrical power 7. The clip shown here has three legs, but for more complex branch-offs clips having four or more legs may be provided. In a further alternative, a two legged clip may be used, where one of the legs comprises a sealing material and has self-heating means. Such a two legged clip would be used with the sealing material within the sleeve and would be used in conjunction with a further member, for example a junction box.

Figure 2:
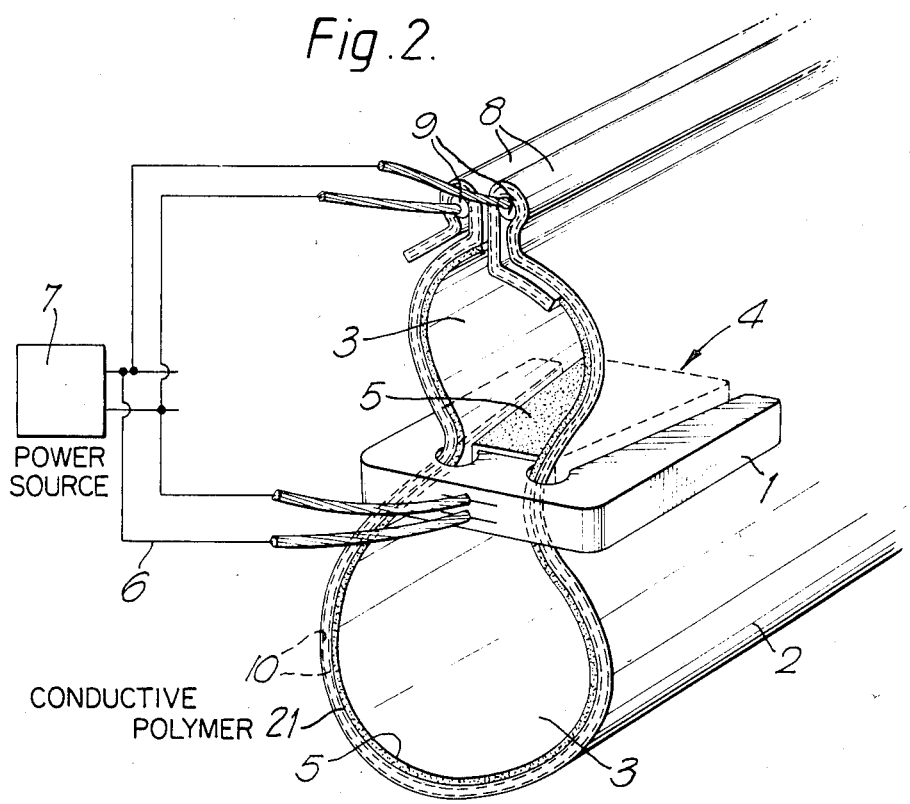
FIG. 2 shows an electrically-heatable sleeve and an electrically-heatable clip.

The clip 1 shown in FIG. 2 is used at an end of an electrically heatable sleeve 2. In this case the sleeve is heat-recoverable, the purpose of the electrical heating being to cause recovery and to activate a heat-activatable inner material 5. This inner material 5 is preferably a coating of a hot-melt adhesive or other material. The recoverable sleeve 2 is of the wraparound type, having opposing longitudinal edge portions 8 which can be held together by an adhesive or by a mechanical device, for example a channel of substantially C-shaped cross-section (not shown but similar to 20 in FIG. 11). The drawing illustrates a preferred embodiment where the edge portions 8 also serve as a means by which powering of the sleeve is achieved. These edge portions 8 incorporate a conductor 9 in electrical contact with two electrodes 10 respectively. The electrodes 10 are separated by a conductive polymer material, by means of which heat is produced. The conductive polymer material 21 is preferably self-regulating, especially by means of PTC electrical properties. In the embodiment shown, the conductive polymeric material serves both as the heater and as the web of the sleeve; however, these two functions could be carried out by discrete components. A self-regulating heater may also be used in the inner leg of the clip. We prefer that the maximum temperatures ordinarily reached at the inner leg and at the sleeve differ by 20° C. or less. The clip and the sleeve are shown wired in parallel to the same power supply, although series wiring or independent wiring may be preferred. A single switching operation need therefore be all that is required, progress of the installation being controlled automatically by the self-regulating properties of the heaters in the clip and sleeve.

Particular designs of heater and heater control for the inner leg of the clip are illustrated in FIGS. 3-6.

The inner leg 4 of the clip 1 shown in FIG. 3 includes a hot-melt adhesive coating 5. This coating 5 is supported and heated by a heater 12 powered by electrodes 11 in electrical contact with conductors 6. The electrodes are provided on either side of the heater 12 so that current passes uniformly through the thickness of the heater. The heater is preferably a conductive polymer composition. A preferred composition is a crystalline thermoplastic matrix comprising, an optionally cross-linked, modified polyethylene or polypropylene together with a carbon black or other conductive material dispersed therein. Such materials display PTC behaviour and therefore provide self-regulation. The adhesive coating 5 may also have a conductive material, such as carbon black, micronised graphite or aluminium powder dispersed therein, in order to improve heat conduction. Aluminium powder is preferred since it is more compatible with aluminium wrapping often used around cables. A layer of electrical insulation may be provided between the electrode 11 and the adhesive 5.

A variation on the design of FIG. 3 is shown in FIG. 4. Here the conductors 11 are of circular cross-section and are embedded in the PTC heater material 12.

Figure 5:
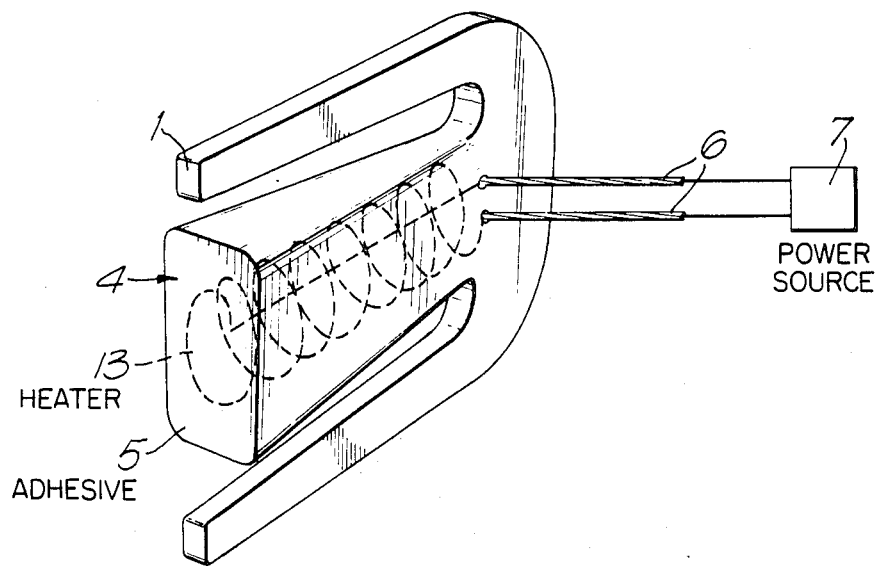

In FIG. 5, the inner leg 4 comprises a hot-melt adhesive 5 through which runs a helically arranged heating wire or member 13. When the heating member 13 is powered, the adhesive softens and the member 13 is allowed to collapse or tighten in response to any mechanical force against it due to the cables or sleeve with which the clip 1 is used. In this way any risk of mechanical damage to the cables or sleeve may be avoided. If a self-regulating device is used to control heating of member 13, risk of damage may be further reduced.

Figure 6:
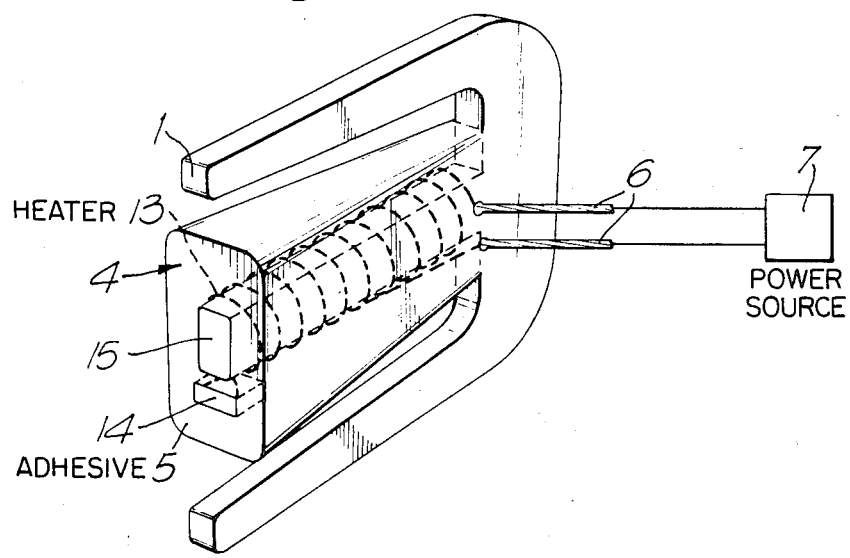

Two further features are shown in FIG. 6, which may but need not be used together. Firstly, a control means 14 is separate from the heating member 13. The heating member 13 is shown as a resistance wire (but it may be any other suitable heater, such as the PTC materials previously mentioned) in series electrical connection with a power supply 7 via conductors 6. The control means 14 registers the temperature at a critical position, for example the part of the sealant which will be coolest during installation, and shuts off the heater when conditions require it. The control means may monitor temperature, and be for example a PTC composition. Alternatively, it may register activation of the sealing material 5. Where the sealing material 5 is a hot-melt adhesive, the means 14 may comprise an electrical contact held against a spring bias in a closed position by the adhesive. When the adhesive melts, the spring is able to open the electrical contact.

The second feature shown in FIG. 6 is a conductive member 15 around which the heating member 13 is wound. the member 15 serves to distribute heat more efficiently to the adhesive 5.

Figure 7:
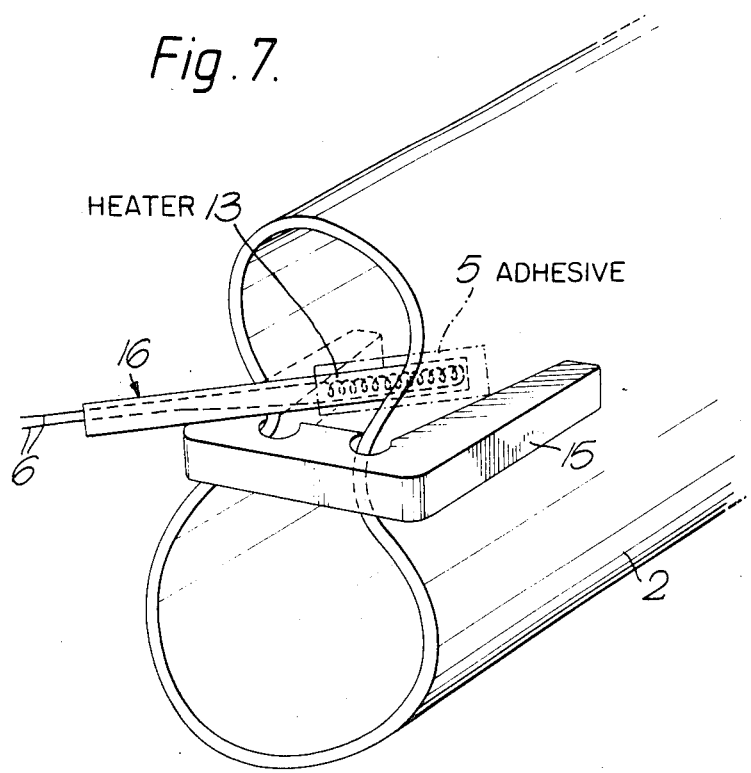
FIGS. 7 and 8 show a heating and sealing member in conjunction with a sleeve and clip.

FIG. 7 shows a heating and sealing member 16 used in conjunction with a clip 15, to provide a branch-off at an end of a sleeve 2. The member 16 comprises a heating means 13 in thermal contact with a heat-activatable sealant 5. The heating member 16 serves to introduce heat, and in the illustrated embodiment sealing material also, into the branch-off region.

Figure 8:
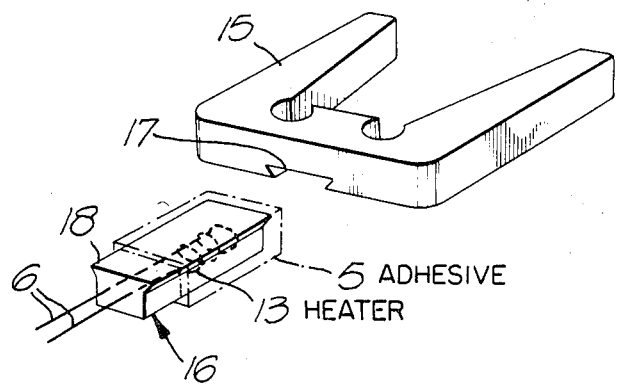

In FIG. 8 the clip 5 and the member 16 are provided with means, 17 and 18, respectively for their interengagement.

FIGS. 9a and 9b show a clip 1 designed for automatic electrical connection to an electrically heatable sleeve 2. The sleeve is of the following construction: a recoverable conductive-polymeric material (preferably exhibiting PTC behaviour) is laminated between two collapsible electrodes (partially shown at 10) such that when a voltage is applied between the two electrodes current flows through the thickness of the sleeve causing the sleeve to become hot and recover. The power is conveniently introduced at a closure mechanism when the sleeve is of the wrap-around type. The electrodes are preferably collapsible so that good electrical contact is maintained between them and the conductive material of the sleeve during recovery. The outer surface of each electrode is covered with a layer of insulation (partially shown at 19). The clip also has as its heater a conductive polymeric material 12 (again preferably exhibiting PTC behaviour) which constitutes at least part of an inner leg 4 of the clip. The automatic electrical connection arises as follows. Power to the clip is tapped from the sleeve by means of clip electrodes 11 which are so designed that one (11a) penetrates the insulation on one side of the sleeve and the other (11b) penetrates insulation on the other side of the sleeve. The electrodes 11a and 11b are in electrical contact with opposing sides of the heater 12 of the inner leg. Thus, the two sides of the heater 12 are subjected to the same potential difference as that between the two electrodes 10 of the sleeve. Although both clip electrodes (11a and 11b) surround the sleeve, the selective electrical contact arises because of the positioning of teeth or other projections which are required for penetration of the sleeve insulation 19. A sealant such as a hot-melt adhesive 5 is provided around the inner leg 4 which is activated by the heater 12. The projections on the electrodes may be shaped for easy installation of the clip on an end of the sleeve and may also serve to prevent milk-off of the clip. In order to ensure good electrical contact between the clip electrode 11 and the sleeve electrodes 10, the outer legs of the clip (or just the electrodes 11) may move together to pinch the sleeve at some stage during installation. This may be achieved by the use of memory metals such as a beta-brass or nickel-titanium alloy.

A variation of this design is shown in FIG. 10. In FIG. 10, one clip electrode, 11a, will contact the inner electrode of the sleeve. Thus electrode 11a is localized on the inner leg of the clip. The other clip electrode 11b picks up current from the outer electrode of the sleeve by virtue of its positioning on the inner surfaces of the outer legs of the clip. Electrode 11b, however, extends from its position at the outer legs of the clip to one side of the inner leg. Thus, opposite sides of the inner leg are subjected to the potential difference that exists between the sleeve electrodes. Other features shown in FIG. 9 may be applied here.

Figure 11:
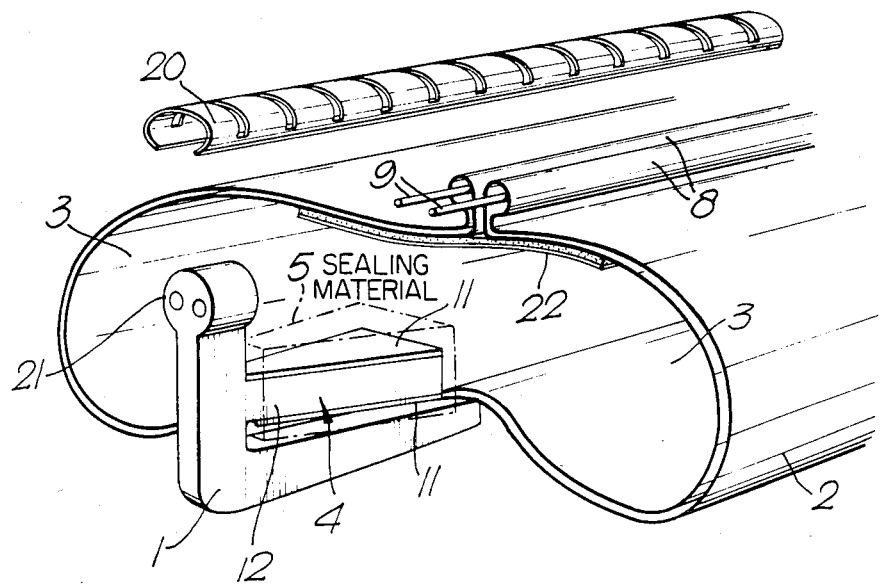

An alternative technique for electrically coupling sleeve and clip (or heating and sealing member) is shown in FIG. 11. Here the sleeve 2 is a wraparound sleeve having opposing edge portions 8 which carry conductors 9 for supplying power to internal electrodes (not shown). The edge portions 8 are held together by a channel 20 which slides over them. The clip 1, as above, is used to divide the sleeve 2 to form two (or more) conduits 3. In this case, however, the clip acts in conjunction with the channel 20. The clip has a lug 21 which mates with the channel: the channel therefore extends a short distance past the ends of the edge portions 8 and slides over (or into) the lug 21. The conductors 9 which power the electrically recoverable sleeve make contact with the clip, for example by passing through holes in the clip to meet electrical contacts therein which are connected to a heater 12 in the inner leg 4. As before, the inner leg 4 is coated with a sealing material 5 for sealing the crutch region between the substrates to be enclosed by the sleeve. FIG. 11 therefore illustrates two ideas which may be used separately, namely the formation of a branch-off in a sleeve by using a partial clip in conjunction with a channel or other closure means, and also the electrical connection between conductors 9 and clip.

A flap 22 is shown, coated with a sealing material, and internally bridging the edge portions 8 to provide a seal between them.

Figure 12:
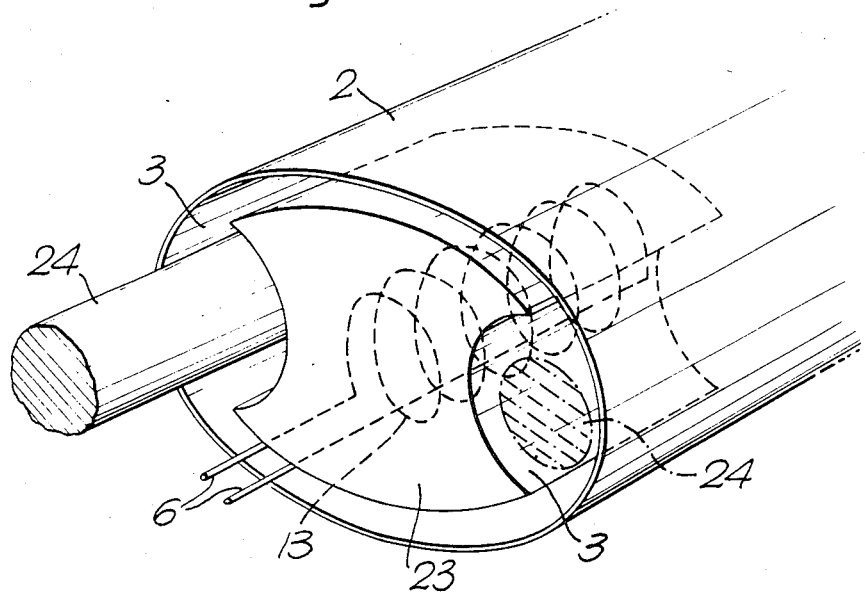
FIG. 12 illustrates an alternative way of providing a branch-off using a filling means between the substrates.

FIG. 12 illustrates an alternative technique for forming a plurality of terminal conduits 3 in a sleeve 2. In the previous figures, a clip 1 was used to bring towards one another circumferentially spaced portions of the sleeve; whereas in this figure a filling means 23 is provided to convert the cross-sectional shape of the substrates to a cross-sectional shape compatible with that of the sleeve. This will generally mean that the cross-sectional shape of the substrates together with the filling means should not be re-entrant. The conversion need not be exact, especially when a recoverable sleeve or when sealing materials are used. In FIG. 12 the filling means lies principally between the substrates 24 (one is only partially shown for clarity), but it may however encase the substrates, for example by being wrapped around them. The filling means can be seen to include a heating means here shown as a resistance heating wire 13 although other heaters may be used, for example conductive polymer materials. The heater terminates in conductors 6. The function of the heater 13 in this embodiment is of course ultimately the same as in the previous embodiments, namely to provide a branch-off seal. In this case, however, heating (optionally after subsequent cooling) may produce expansion of the filling means or it may cause an increase in its viscosity. In this way a permanently stable filling piece is obtained after flexibility required at installation. The sleeve 2 may be heat-shrinkable, in which case a flexible, or unexpanded filling means 23 could first be installed, the sleeve shrunk into engagement, and the filling means heated to cause any remaining voids to be filled and the filling means to become rigid. Where a change in viscosity is desirable, it is preferred that heat at first produces a decrease in viscosity (to enable the filling means to distort to fill all voids) and then an increase in viscosity (to provide a permanent structure able to pass temperature/pressure cycling tests etc).

Figure 13:
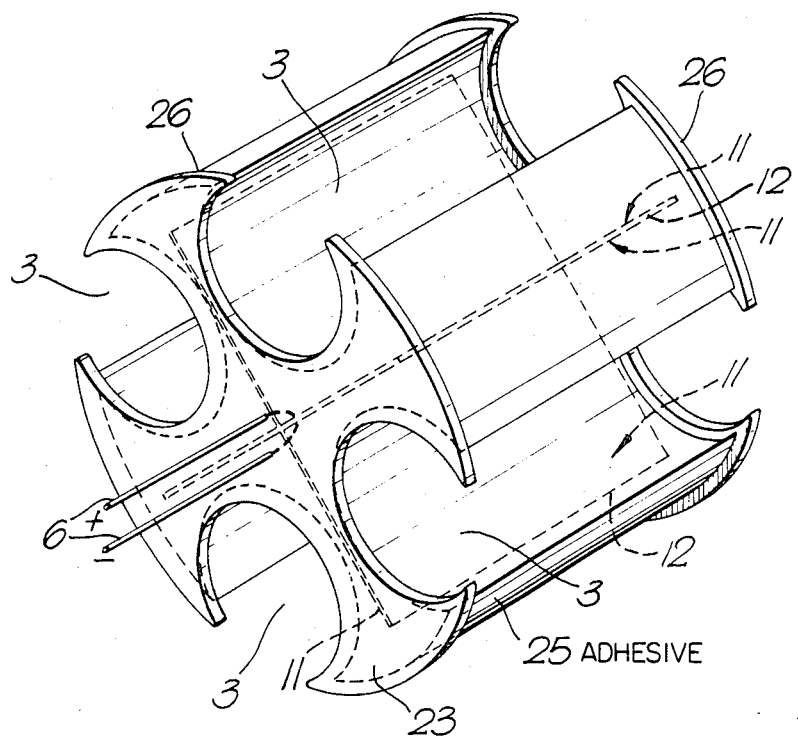
FIG. 13 illustrates a different filling means for a branch-off of four substrates.

A filling means 23 is also shown in FIG. 13, but here it is designed for a branch-out of four cables or other substrates, and no external sleeve is shown. The filling means preferably comprises a heat-activatable sealing material, such as a hot-melt adhesive 25, and a heater 12 together with electrodes 11 connected to conductors 6 by any suitable means such as partially insulated rivets. Generally, two end pieces 26 will be provided (as drawn) to prevent flow of activated sealing material longitudinally, but in some circumstances one may be sufficient; at an end of a cable splice case for example the outwardly facing end of the filling piece only may require an end piece to prevent softened adhesive from flowing away. The end pieces may comprise a foam or other suitable material. The sealing material may of course remain sufficiently viscous on activation that the end pieces may be dispensed with. For example, a filling piece could be produced from a sealing material having a central portion (reckoned longitudinally) of lower melt viscosity or lower melt transition temperature than its end portions. These different viscosity characteristics may be inherent in the material or materials comprising the sealing material, or they may be induced. For example different regions of the sealing material may be differentially loaded with thermally conductive or viscosity regulating fillers. Another possibility is to arrange the heater 12 preferentially to heat a central portion of the sealing material. This could be done, for example, by localizing the heater in the central portion or by constructing the heater such that it produced the desired temperature gradients.

The heater 12 illustrated comprises a conductive polymer composition in sheet form between sheet electrodes 11, although a simple resitive wire or other heater could be used. The heater has four fins, each of which extends between a pair of conduits 3. The heater and electrodes are preferably perforated in order to allow some flow of sealing material in a generally circumferential direction. The heater is preferably self-regulating with respect to temperature, and we prefer that this be achieved by means of a positive temperature coefficient of resistance of the conductive polymer composition that constitutes the heater 12. A separate control could however be used. Two or more separate heaters may be used, in which case it is preferred that they be electrically connected together as part of the filling means so that only one set of electrical connections has to be made in the field. As with the filling means of FIG. 12, this filling means is preferably used within an end of a recoverable, particularly heat-shrinkable, especially electrically heat-shrinkable, sleeve to form at least part of a cable splice case. We have found that the filling means is particularly useful in the production of splices cases between pressurized telecommunications cables, where an environmental seal must be maintained under conditions which may put the adhesive under peel.

The filling means illustrated may be modified, particularly as regards their cross-sectioned shape, to make them suitable for branch-offs between different numbers of cables, different branch-off configurations, and cables of different sizes.

We claim:

1. A branch-off clip which comprises at least two outer legs and an inner leg, so arranged that the clip can be positioned over an outer surface of a sleeve at an end thereof with the outer legs outside the sleeve and the inner leg inside the sleeve to form at least two terminal conduits in the sleeve; the inner leg comprising a heating means.

2. A clip according to claim 1, in which the inner leg is integral with the outer legs.

3. A clip according to claim 1, in which the inner leg comprises the heating means and a heat-activatable sealing material.

4. A clip according to claim 1, in which the heating means is self-regulating with respect to temperature.

5. A clip according to claim 1, which additionally comprises a temperature regulator by means of which the heat generated by the heating means can be regulated.

6. A clip according to claim 1, in which the heating means is powerable by electrical power.

7. A clip according to claim 6, in which the heating means is an electrical resistance heater.

8. A clip according to claim 7, in which the heating means comprises a resistance wire.

9. A clip according to claim 7, in which the heating means comprises a conductive polymeric material.

10. A clip according to claim 9, in which the conductive polymeric material has a positive temperature coefficient of resistance, by means of which the heating means is self-regulating with respect to temperature.

11. A clip according to claim 1, in which the inner leg comprises: an electrically powerable heating means; a hot-melt adhesive; and a control means for the electrical power responsive to the viscosity of the adhesive.

12. An assembly for enclosing a branch-off between substrates, which comprises a sleeve which can surround the substrates and a clip, which comprises at least two outer legs and an inner leg, positioned with the outer legs outside the sleeve and the inner leg inside the sleeve to form at least two terminal conduits in the sleeve; the inner leg comprising a heating means.

13. An assembly according to claim 12, in which the sleeve is recoverable.

14. An assembly according to claim 13, in which the sleeve is heat-recoverable.

15. An assembly according to claim 12, in which the sleeve has an internal surface which comprises a heat-activatable sealing material.

16. An assembly according to claim 14, in which the sleeve includes a heating means.

17. An assembly according to claim 16, in which the sleeve includes a heating means powerable by electrical power.

18. An assembly according to claim 16, in which the heating means is self-regulating with repsect to temperature.

19. An assembly according to claim 18, in which the heating means of the clip is self-regulating with respect to temperature, and the self-regulating characteristics of the clip and sleeve are such that the maximum temperatures ordinarily reached at the inner leg and at the sleeve differ by 20° C. or less.

20. An assembly according to claim 12, in which the heating means for the inner leg and for the sleeve each are powerable by electrical power from the same source.

21. A heating and sealing member positionable within an end portion of a sleeve, and which comprises an elongate member having self contained heating means and an outer surface comprising a heat-activatable sealing material in thermal contact with the heating means.

22. A member according to claim 21, in which the heating means is powerable by electrical power and is self-regulating with respect to temperature.

* * * * *